(12) United States Patent
Gannan

(10) Patent No.: US 12,213,474 B2
(45) Date of Patent: Feb. 4, 2025

(54) BAIT STATION

(71) Applicant: PestSense Holdings Pty Limited, Brisbane (AU)

(72) Inventor: Dylan Jacob Gannan, Rockhampton (AU)

(73) Assignee: PESTSENSE HOLDINGS PTY LIMITED, Brisbane (AU)

( * ) Notice: Subject to any disclaimer, the term of this patent is extended or adjusted under 35 U.S.C. 154(b) by 0 days.

(21) Appl. No.: 18/030,718

(22) PCT Filed: Oct. 7, 2020

(86) PCT No.: PCT/AU2020/051077
§ 371 (c)(1),
(2) Date: Apr. 6, 2023

(87) PCT Pub. No.: WO2022/073056
PCT Pub. Date: Apr. 14, 2022

(65) Prior Publication Data
US 2024/0057582 A1    Feb. 22, 2024

(51) Int. Cl.
*A01M 25/00* (2006.01)
*A01M 31/00* (2006.01)

(52) U.S. Cl.
CPC ......... *A01M 25/004* (2013.01); *A01M 31/002* (2013.01)

(58) Field of Classification Search
CPC .................................................. A01M 25/004
See application file for complete search history.

(56) References Cited

U.S. PATENT DOCUMENTS

| | | | |
|---|---|---|---|
| 2010/0031557 A1* | 2/2010 | Vickery | E05B 19/00 43/131 |
| 2013/0145801 A1* | 6/2013 | Covington | E05B 35/008 70/344 |
| 2017/0360026 A1 | 12/2017 | Zirkle et al. | |
| 2018/0007889 A1 | 1/2018 | Bittlinger et al. | |
| 2019/0075783 A1 | 3/2019 | Buchstaller | |

(Continued)

FOREIGN PATENT DOCUMENTS

| | | |
|---|---|---|
| CN | 205865712 U | 1/2017 |
| CN | 207897788 U | 9/2018 |

(Continued)

OTHER PUBLICATIONS

International Search Report issued Nov. 13, 2020 in connection with PCT Application No. PCT/AU2020/051077.

(Continued)

*Primary Examiner* — Jessica B Wong
(74) *Attorney, Agent, or Firm* — Akerman LLP

(57) ABSTRACT

A bait station for pest control, the bait station comprising: an enclosure defining an access chamber and a bait chamber, said access chamber including at least one entry port for permitting entry of a pest into said enclosure, said bait chamber configured to hold therein bait material harmful to the pest; and a load sensing module arranged in the bait chamber for sensing changes in weight of bait material positioned in said bait chamber and operable to output signal indicative of sensed changes in weight of the bait material and transmit said output signal to a remote location.

11 Claims, 4 Drawing Sheets

(56) References Cited

U.S. PATENT DOCUMENTS

2019/0124913 A1  5/2019  Power
2024/0237630 A1  7/2024  Deuscher

FOREIGN PATENT DOCUMENTS

WO  2012/120263 A1  9/2012
WO  2022/238292 A1  5/2021

OTHER PUBLICATIONS

Written Opinion of the International Searching Authority issued Nov. 13, 2020 in connection with PCT Application No. PCT/AU2020/051077.
Partial Transcript of Pest Geek Podcast dated May 13, 2020 (15 pages).

* cited by examiner

BAIT STATION

CROSS-REFERENCE TO RELATED APPLICATIONS

This application is a U.S. national phase application of PCT/AU2020/051077, filed Oct. 7, 2020, the entire contents of which are hereby incorporated by reference.

TECHNICAL FIELD

The present invention relates to bait stations for combating pests such as mice and, rats that include electronic systems and methods for detecting the presence and monitoring the activity of such pests.

BACKGROUND

Any references to methods, apparatus or documents of the prior art are not to be taken as constituting any evidence or admission that they formed, or form part of the common general knowledge.

Small animal pests, such as mice and rats, are typically controlled by the strategic placement of traps and/or poisons. Such traps and/or poisons are placed in areas of known or suspected pest activity. In order for such control methods to be used efficiently and effectively, it is important to have accurate information concerning pest activity, including information on bait consumption and the patterns of bait consumption. Such information may be used, for example, to minimize the number of traps required to control a pest population and replenish bait stations with bait and possibly even schedule replenishment of bait stations based on consumption patterns.

Electronic detection and counting devices may be used for monitoring pest activity. An example of such a device is described in U.S. Pat. No. 5,040,326 to Van Dijnsen, et al. This patent describes a system for detecting pests which includes a luring box having an entrance aperture sized to let a small rodent enter the box. A detector or sensor is mounted in the box near the entrance aperture, and is activated by the presence of a rodent in the box. Such previously known electronic pest monitoring devices are limited in their usefulness both by the limited pest activity information which they provide and in their lack of ease of use. Such devices typically provide only a count which is related to the number of pests entering a selected location in which the monitoring device is positioned.

What is desired, therefore, is an improved electronic pest monitoring system which provides sufficiently detailed pest activity information to provide effective and efficient pest control, and which is both easy to deploy and use.

SUMMARY OF INVENTION

In an aspect, the invention provides a bait station for pest control, the bait station comprising:
  an enclosure defining an access chamber and a bait chamber, said access chamber including at least one entry port for permitting entry of a pest into said enclosure, said bait chamber configured to hold therein bait material and
  a load sensing module arranged in the bait chamber for sensing changes in weight of bait material positioned in said bait chamber and operable to output signal indicative of sensed changes in weight of the bait material and transmit said output signal to a remote location.

In an embodiment, the bait station further comprises a detector module associated with the access chamber for detecting presence of a pest in said access chamber and operative to output a signal indicative of presence or otherwise of a pest.

In an embodiment, the detector module is operatively coupled with the load sensing module to activate the load sensing module to sense changes in the weight of the bait material in response to detecting presence of the pest in the access chamber.

In an embodiment, the load sensing module comprises one or more load cells arranged relative to a platform portion of the bait chamber, each load cell being coupled with bait holding members for sensing changes in weight of the bait material.

In an embodiment, the bait holding members comprise upright posts coupled with the load cells positioned along an underside of the bait chamber.

In an embodiment, walls defining an interior volume of the bait station comprise one or more apertures for allowing the bait holding members to pass through and be coupled with each load cell located thereunder.

In an embodiment, a plurality of said bait holding members are coupled to a single cell.

In another embodiment, the bait holding member extends across the internal volume of the bait chamber in a substantially horizontal bait holding orientation, the bait holding member being elongate and extending between two ends such that each end is supported by an in-use upper portion of a supporting clip adapted to be fastened to bait holding member wherein the lower portion of the supporting clip is operatively coupled with the load sensing module.

In an embodiment, the load sensing module comprises a load sensing cell positioned on a load cell supporting bar extending at an inclination angle (a) relative to a base surface of the enclosure, the load supporting bar and the load sensing cell being configured for sensing changes in weight of bait material positioned on the bait holding member when the bait station is positioned in a plurality of in-use orientations.

In an embodiment, the inclination angle is less than 90 degrees and more preferably in the range of 15 degrees and 75 degrees and more preferably at an angle of substantially 45 degrees.

In an embodiment, the bait chamber is defined by at least two laterally spaced apart upstanding walls extending from the base surface and wherein a respective load sensing module is positioned adjacent each of the upstanding walls.

In an embodiment, each respective load sensing module is positioned in a partially enclosed cavity defined by a corresponding upstanding wall and an outer wall of the bait station.

In an embodiment, the load cell engaging bar is mounted on one or more mounting locations along an internal surface of the outer wall defining said cavity.

In an embodiment, the load cell engaging bar is mounted on two spaced apart mounting locations to orient the load cell supporting bar at the inclination angle (a).

In an embodiment, the load cell supporting bar extends transversely relative to a plane of the upstanding wall to arrange the load cell engaging bar and the load sensing cell in a configuration for sensing changes in weight of bait material positioned on the bait holding member when the bait station is positioned in a plurality of in-use orientations.

In an embodiment, one or both of the upstanding walls further comprise a slot located along an in-use edge of the upstanding walls to allow the bait holding member to pass through when supported on the load cell during use.

In an embodiment, the load sensing module is located outside an internal space of the bait chamber or the access chamber to prevent damage to electrical componentry by pests.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
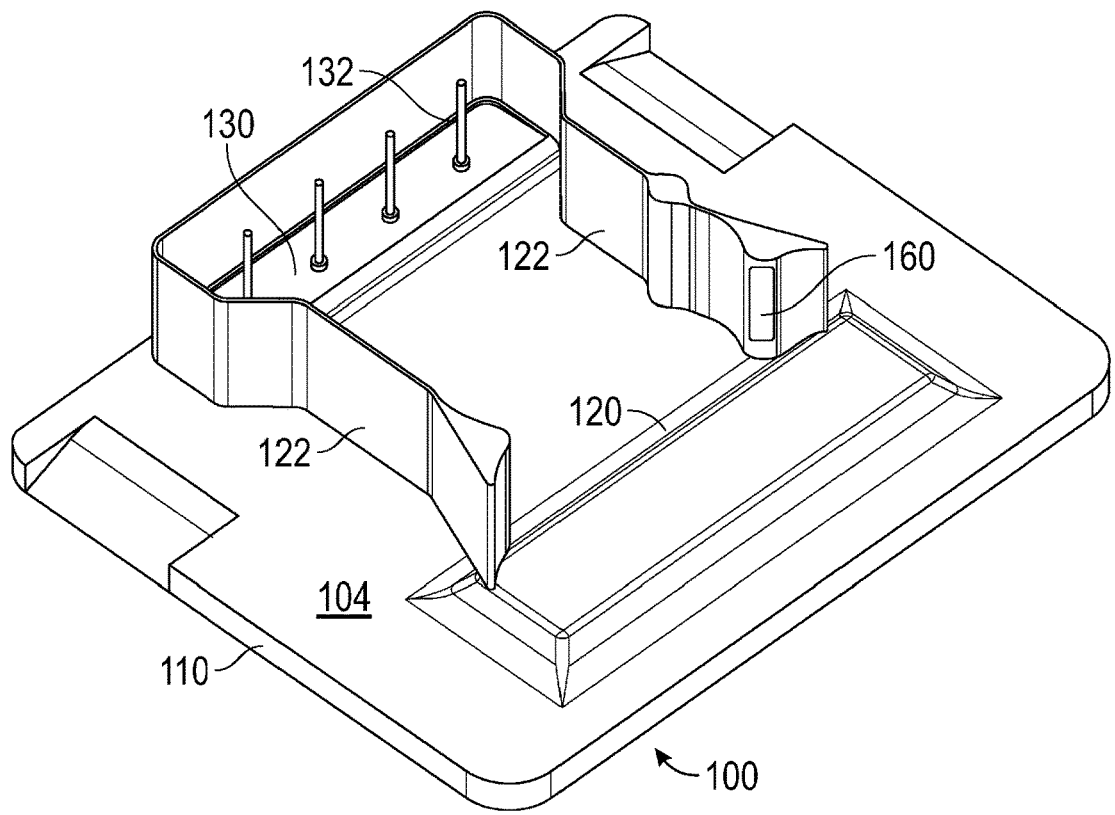
FIG. 1 is a top perspective view of a bait station 100 in accordance with an embodiment.
Figure 2:
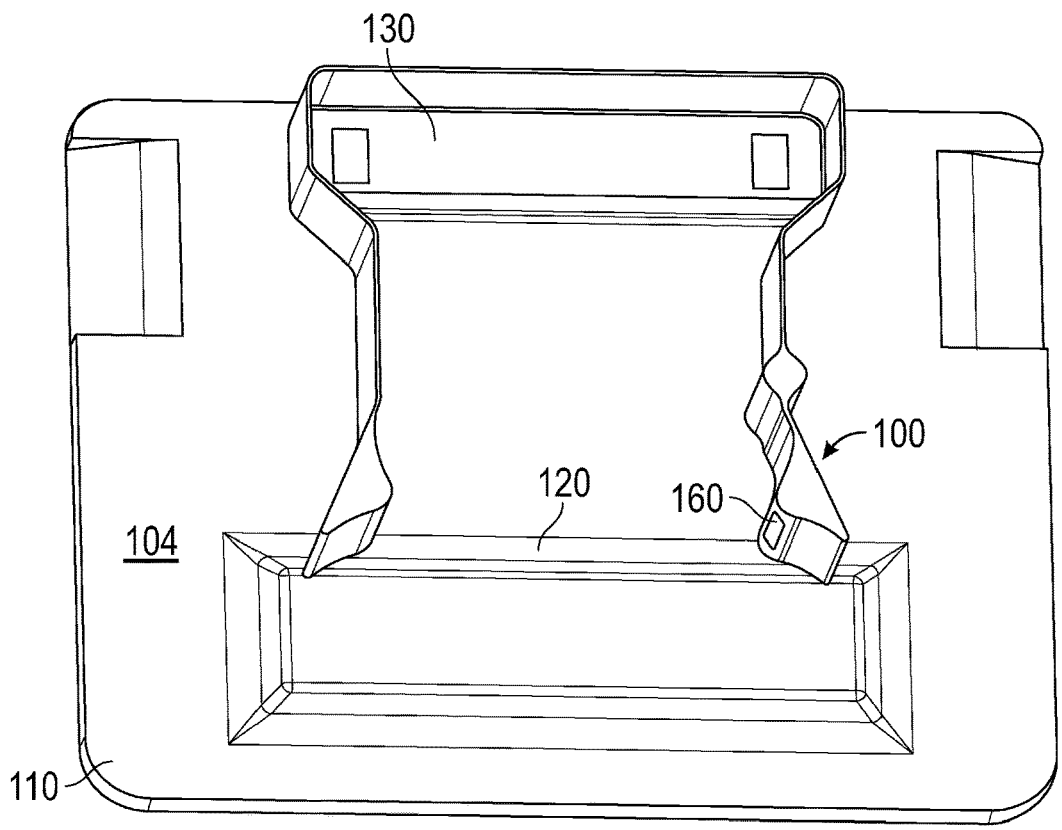
FIG. 2 is a top view of the bait station 100.
Figure 3:
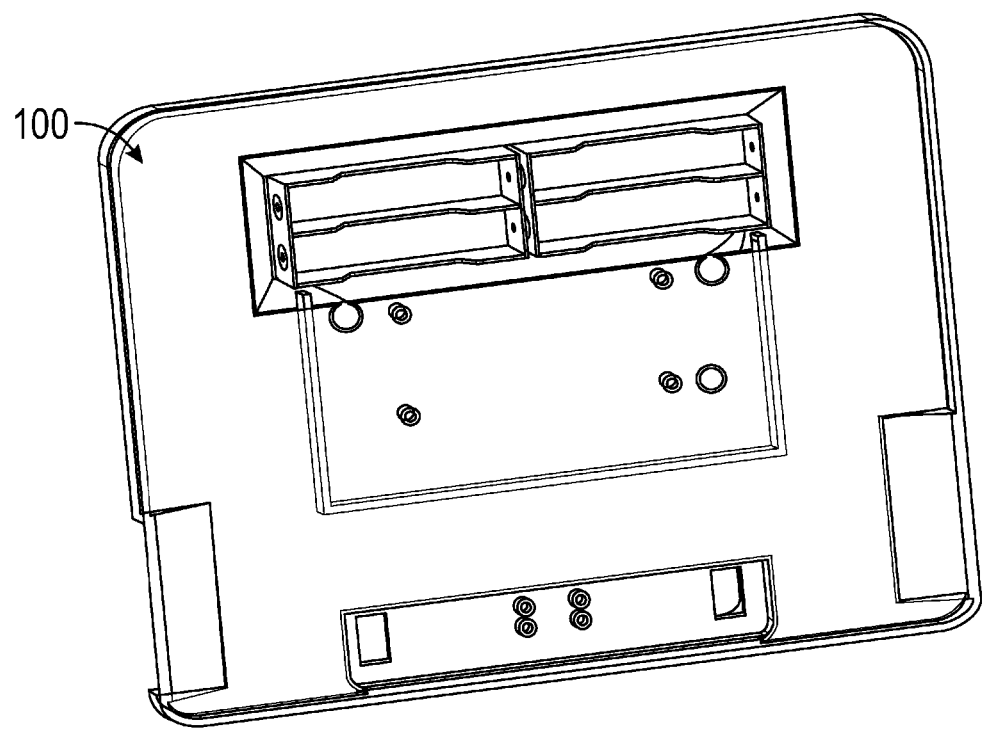
FIG. 3 is a bottom view of the bait station 100.

FIGS. 1 to 4 illustrate a first embodiment of the bait station 100 in accordance with an embodiment of the invention. In relation to the figures, FIGS. 1 and 2 illustrate top views of a bait station 100 in an open state (whereby the top cover or lid has been removed). The bait station 100 comprises a housing 110, which is formed from lid portion (not shown) and a base portion 104. The lid portion and base portion 104, in one or more embodiments, may connected by a hinge arrangement or any other arrangement provided in the region of adjacent longitudinal edges of the lid portion and base portion 104. With such a configuration, the lid and base portions may combine to resemble a "clam-shell". The lid may be provided with access ports (not shown) to allow the pest to enter the access chamber 120 that provides an enclosed internal space bound by convergent lateral walls 122. The access chamber 120 is formed continuously with and leads into a bait chamber 130. The bait chamber 130 is structured to hold bait material that is harmful to the pest. The invention is not limited in any manner by the nature of bait material used and all types of bait material may be used without departing from the scope of the presently described embodiment.

Figure 4:
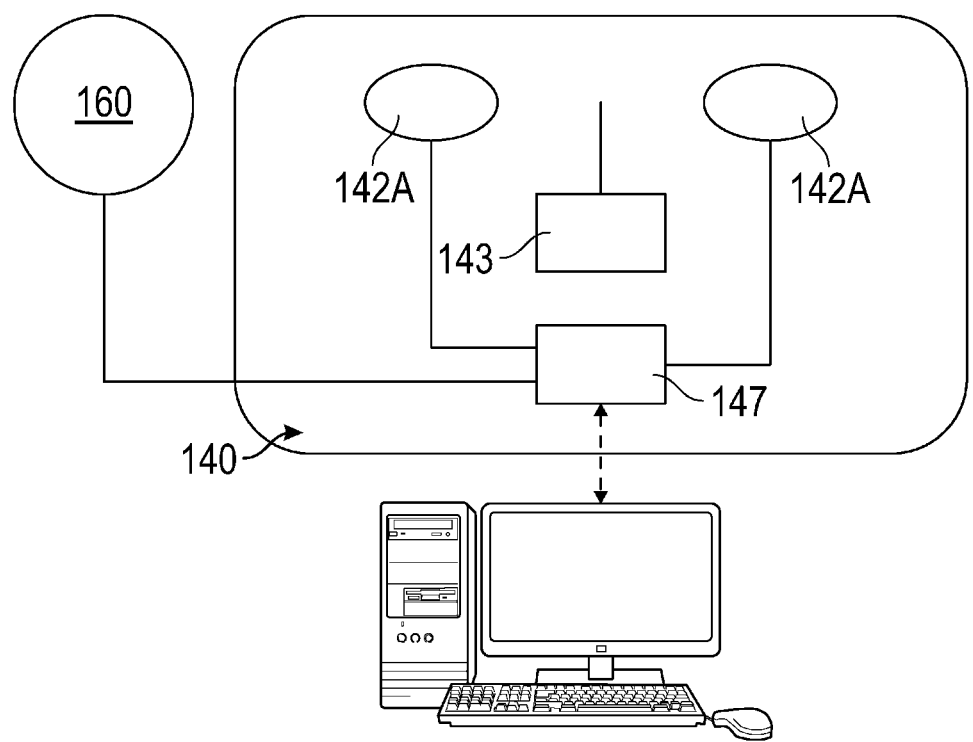
FIG. 4 is a schematic view of the detection module 160 and the load sensing module 140.
Figure 5:
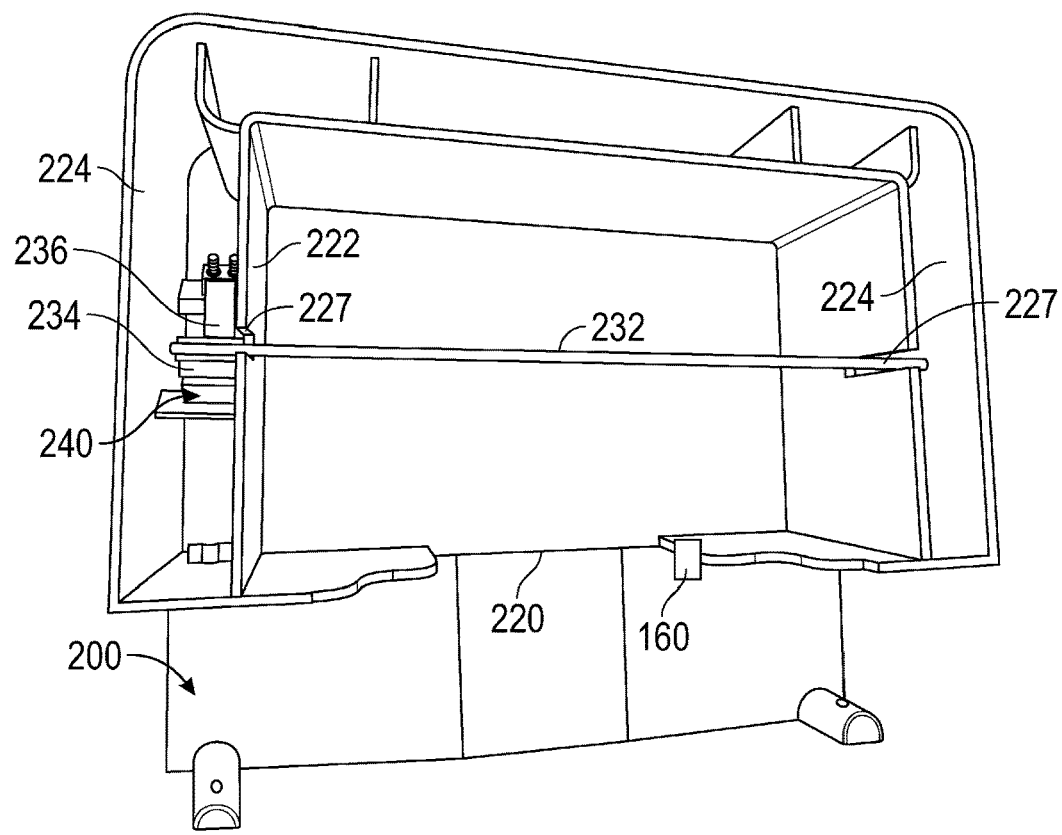
FIG. 5 is a top perspective view of a bait station 200 in accordance with an embodiment.
Figure 6:
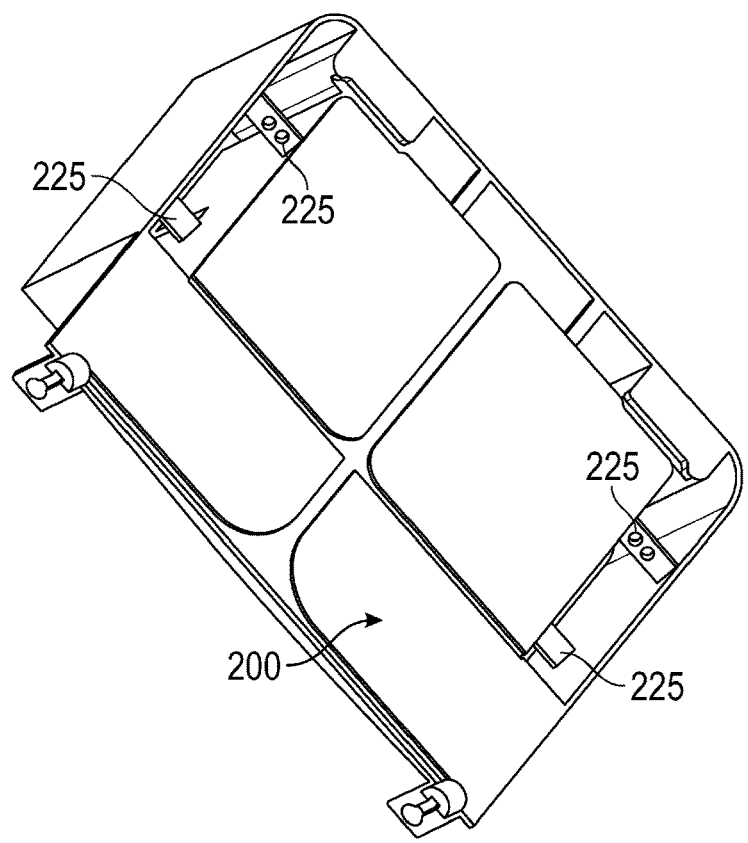
FIG. 6 is an underside view of the bait stations 200.
Figure 7:
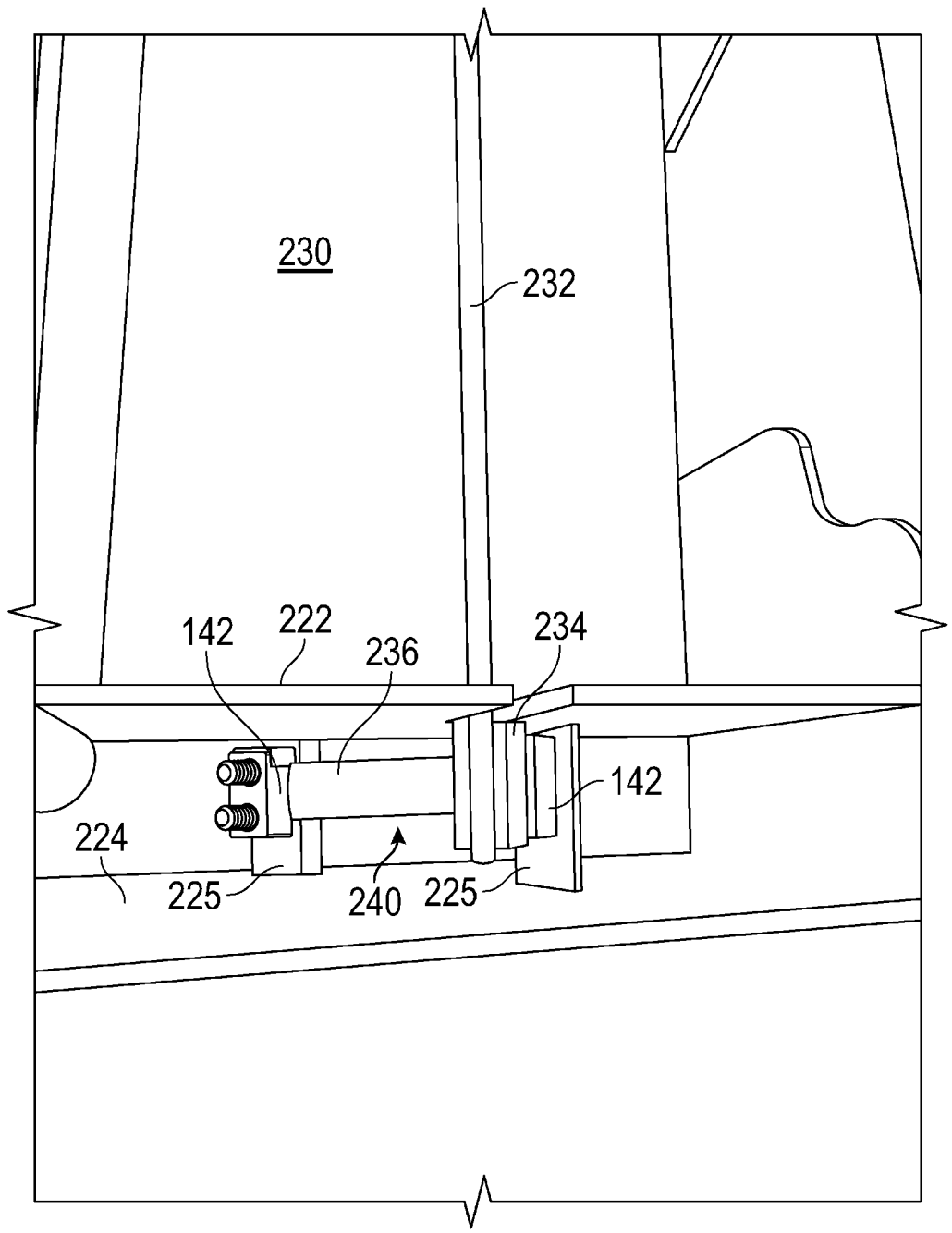
FIG. 7 is an enlarged view of the load sensing module 240 used in the bait station 200.

The bait chamber 130 includes a load sensing module 140 arranged in the bait chamber for sensing changes in weight of bait material positioned in the bait chamber 130. The load sensing module is operable to output signal indicative of sensed changes in weight of the bait material and transmit the output signal to a remote location. FIG. 4 illustrates an exemplary and non-limiting embodiment of the load sensing module 140. The load sensing module 140 may be conveniently provided on a PCB circuit board and may include a plurality of load cells (also known as transducers) 142A and 142B (generally denoted by 142). Each load cell 142 is operatively coupled with bait holding posts 132 that extend orthogonally relative to the base 104 of the housing enclosure 110. The load sensing module 140 is preferably located along an underside portion of the base 104 (to minimise exposure to water, moisture and pest faeces) and the four bait holding posts 132 extend upwardly from the base 104 to allow bait material to be loaded on said bait holding posts 132.

The load cells 142 may be in electrical communication with an actuation switch 143 to activate or de-activate the load cells 142. During use, the load cells 142 are arranged to sense any changes in weight of the bait material loaded or supported on the bait holding posts. Signal data from the load cells 142 may be communicated to a remotely located server or computing device (not shown) via a trans-receiver unit 145 which forms a part of the load sensing module 140. Output signals from the load cells 142 may be transmitted via the trans-receiver unit 147 to provide an indication of any changes in weight of the bait material loaded on the bait holding posts. In some embodiments, the trans-receiver unit 147 may be operable to be in communication with an on-board microprocessor 149 to undertake processing of the signals before the processed signals are communicated via the trans-receiver unit 147. The load cells 142 may undertake measurements at a pre-determined sampling rate. The output signal received at the remote location may be processed to determine changes in the weight of bait material during specified periods of time. It would be understood that a power source such as but not limited to a battery (including a rechargeable battery) may be provided to power the load sensing module 140.

At the entrance portion of the access chamber 120, a detector module 160 is provided for detecting presence of a pest as the pest enters the access chamber 120. The detector module 160 is operative to output a signal indicative of presence of a pest in the access chamber 120. In the preferred embodiment, the detector module 160 may include emitter detector pairs (electro-optic or infrared devices) denoted by 162 and 164 such that as the pest enters the access chamber 120, it would be expected to pass through the electromagnetic radiation beam extending between one of the emitter/detector pairs 162 and 164. Each time, the electromagnetic beam is broken by the entry and/or exit of the pest, an output signal indicative of the presence of the pest may be generated and transmitted to a remote location. In some embodiments, the detector module may save the number of breaks detected by the detector module 160 and this number may be saved and transmitted on a periodic basis for conserving energy in the system. In the preferred embodiment, the detector module 160 may be coupled with the load sensing module to activate the load sensing module 140 (via the actuation switch) when the pest enters the access chamber 120 to undertake weight measurements for the bait materials during periods when the pest is present in the access chamber. In other embodiments, the load sensing module 140 may undertake weight measurements at pre-determined intervals independent of any triggering. The detector module 160 may also generate an output signal associate with the presence of the pest and communicate information related to the presence of the pest via the trans-receiving unit 147 of the load sensing module 140. The combination of the aforementioned detection module 160 and the load sensing module 140 provides data related to bait consumption patterns for various pests and helps monitor and schedule bait replenishment for the bait stations. In at least some optional embodiments, the usage of the load sensing module 140 only during periods when the pest is present within the enclosure 110 of the bait station 100 alleviates the requirement to keep the load sensing module 140 constantly activated. The arrangement of the load sensing module 140 and the detector module 160 also allows any changes of weight of bait material to be co-related with pest movement detected by the detector module 160.

Any data associated with the detector module 160 and/or the load sensing module 140 may be transmitted to a remote location via one or more wireless technologies such as LORA (Long Range) or short range wireless technologies including Wi-Fi and CATM1 (cellular).

It is important to appreciate that the load sensing module 140 either alone or in combination with the detector module 160 may be retrofitted into existing bait stations to upgrade existing bait stations.

Referring to FIGS. 5 to 8, a second embodiment of the bait station 200 has been illustrated. Like reference numerals denote like features which have been previously described. Unlike the previously described embodiment, the bait station 200 comprises a large and centrally located bait chamber 230 that with an access opening 220 that allows the pest into the bait chamber 230. The detector module 160 may be located at the access opening 220 to detect the presence of a pest entering the bait chamber 230. The bait holding member 232 in an in-use position extends across the internal volume of the bait chamber 230 in a substantially horizontal bait holding orientation. The bait holding member 232 is elongate and extends between two ends such that each end is supported by an in-use upper portion of a supporting clip 234 adapted to be fastened to bait holding member 232. The supporting clip 234 is operatively coupled with a respective load sensing module 240. It is important to appreciate that the load sensing module 240 also comprises electronic load cells (similar to load cells 142 described earlier) that are adapted to measure any changes in weight of bait material loaded on the bait holding member 232.

The load sensing module 240 comprises a load cell engaging bar 236 (which is integrally formed with the supporting clip 234) that extends at an inclination angle (which may be generally denoted by a) relative to the horizontal base surface of the bait chamber 230. The load cell engaging bar 236 engages with load sensing cells 142 positioned thereunder. The load cell engaging bar 236 is configured for sensing changes in weight of bait material positioned on the bait holding member 232 when the bait station 200 is positioned in a plurality of in-use orientations. In the preferred embodiment, the inclination angle α is substantially 45 degrees. However, this angle is not limiting and may be varied to other angles between 0 and 90 degrees without departing from the intended scope of the invention.

The bait chamber 230 is defined by the two laterally spaced apart upstanding walls 222 extending from the base surface and the respective load sensing modules 240 are positioned adjacent each of the upstanding walls. Specifically, each load sensing module 240 is enclosed positioned in a partially enclosed cavity defined by a corresponding upstanding wall 222 and an outer wall 224 of the bait station 200. The load cell engaging bar 236 is mounted on two spaced apart mounting members 225 (best shown in FIG. 6) along an internal surface of the outer wall 224 the upstanding wall 222. The mounting member 225 are arranged in a manner such that the load cell engaging member 234 extends transversely relative to a plane of the upstanding wall 222 to arrange the load cell engaging bar 236 and the load sensing cell in a configuration for sensing changes in weight of bait material positioned on the bait holding member when the bait station is positioned in a plurality of in-use orientations. In the preferred embodiment, the load cells are positioned on the mounting members 225 and the load cell engaging bar 236 is mounted thereon. Advantageously, both upstanding walls 222 include slots 227 located along an in-use edge of the upstanding walls to allow the bait holding member 232 to pass through when supported on the load cell during use.

The angled configuration of the load cell engaging bar 236 in combination with load sensing module 240 and the bait holding member 232 allows the bait station 200 to be used in a plurality of orientations. For example, in a narrow space, the bait station 200 may be positioned to align the base surface 220 of the bait station 200 to be substantially vertical. In other scenarios, the bait station may be positioned on undulating or sloping surfaces at an angle. The novel configuration of the load cell engaging member 236 allows changes in weight of bait material (as loaded on the bait holding member 232) to be sensed irrespective of the orientation. The transverse or angled orientation of the load cell engaging member 236 ensures that in all of the plurality of orientations, a vertical weight component of the bait material acts on the load cells positioned below the transversely oriented load cell engaging member 236.

Additionally, an accelerometer (such as an electronic gyroscopic module) may also be coupled with the load sensing module to allow measurement or sensing of the in-use orientation of the bait station 200. Such information would allow users to, more accurately calculate, the real weight of the bait material loaded on the bait holding member 232.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

What is claimed is:

1. A bait station for pest control, the bait station comprising:
   an enclosure defining an access chamber and a bait chamber, said access chamber including at least one entry port for permitting entry of a pest into said enclosure, said bait chamber configured to hold therein bait material; and
   a load sensing module arranged in the bait chamber for sensing changes in weight of bait material positioned in said bait chamber and operable to output an output signal indicative of sensed changes in weight of the bait material and transmit said output signal to a remote location;
   the load sensing module comprising one or more load cells arranged relative to a platform portion of the bait chamber, each load cell being coupled with one or more bait holding members for sensing changes in weight of the bait material;
   wherein a bait holding member extends across an internal volume of the bait chamber in a substantially horizontal bait holding orientation, the bait holding member being elongate and extending between two ends of the bait station such that each end is supported by an in-use upper portion of a supporting clip adapted to be fastened to the bait holding member wherein a lower portion of the supporting clip is operatively coupled with the load sensing module; and wherein the load sensing module comprises a load sensing cell positioned in engagement with a load cell engaging bar extending at an inclination angle ($\alpha$) of less than 90 degrees relative to a base surface of the enclosure, the load cell engaging bar and the load sensing cell being configured for sensing changes in weight of bait material positioned on the bait holding member when the bait station is positioned in a plurality of in-use orientations;

the bait chamber being defined by at least two laterally spaced apart upstanding walls extending from the base surface and wherein a respective load sensing module is positioned adjacent each of the upstanding walls;

wherein the load cell engaging bar is mounted on two spaced apart mounting locations to orient the load cell engaging bar at the inclination angle ($\alpha$) of less than 90 degrees such that during use, the load cell engaging bar extends transversely relative to a plane of the upstanding walls to arrange the load cell engaging bar and the load sensing cell in a configuration for sensing changes in weight of bait material positioned on the bait holding member when the bait station is positioned in a plurality of in-use orientations.

2. The bait station in accordance with claim 1, further comprising a detector module associated with the access chamber for detecting presence of a pest in said access chamber and operative to output a signal indicative of presence or otherwise of a pest.

3. The bait station in accordance with claim 2, wherein the detector module is operatively coupled with the load sensing module to activate the load sensing module to sense changes in the weight of the bait material in response to detecting presence of the pest in the access chamber.

4. The bait station in accordance with claim 1, wherein the one or more bait holding members comprise upright posts coupled with the one or more load cells positioned along an underside of the bait chamber.

5. The bait station in accordance with claim 4, wherein walls defining an interior volume of the bait station comprise one or more apertures for allowing the one or more bait holding members to pass through and be coupled with each load cell located thereunder.

6. The bait station in accordance with claim 4, wherein a plurality of said one or more bait holding members are coupled to a single cell.

7. A bait station in accordance with claim 1, wherein the inclination angle is in a range of 15 degrees and 75 degrees and more preferably at an angle of substantially 45 degrees.

8. A bait station in accordance with claim 1, wherein each respective load sensing module is positioned in a partially enclosed cavity defined by a corresponding upstanding wall and an outer wall of the bait station.

9. A bait station in accordance with claim 8, wherein the load cell engaging bar is mounted on one or more mounting locations along an internal surface of the outer wall defining said cavity.

10. A bait station in accordance with claim 1, wherein one or both of the upstanding walls further comprise a slot located along an in-use edge of the upstanding walls to allow the bait holding member to pass through when supported on the load cell during use.

11. A bait station in accordance with claim 1, wherein the load sensing module is located outside an internal space of the bait chamber or the access chamber to prevent damage to electrical componentry by pests.

* * * * *